(12) United States Patent
Bennett (10) Patent No.: US 6,988,350 B2
(45) Date of Patent: Jan. 24, 2006

(54) PACKAGING SYSTEM

(75) Inventor: Robert Bennett, West Midlands (GB)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 10/195,020

(22) Filed: Jul. 15, 2002

(65) Prior Publication Data

US 2003/0014944 A1    Jan. 23, 2003

(30) Foreign Application Priority Data

Jul. 18, 2001  (GB) ................................. 0117504

(51) Int. Cl.
*B65B 35/30* (2006.01)
(52) U.S. Cl. ............................ 53/544; 53/537; 53/535
(58) Field of Classification Search ............... 53/531, 53/535, 537, 151, 544
See application file for complete search history.

(56) References Cited

U.S. PATENT DOCUMENTS

| | | |
|---|---|---|
| 4,466,770 A | 8/1984 | Peroutky |
| 4,776,148 A | 10/1988 | Mingozzi |
| 4,864,801 A * | 9/1989 | Fallas ........................... 53/446 |
| 5,123,231 A | 6/1992 | Fallas et al. |
| 5,263,302 A | 11/1993 | Hauers et al. |
| 5,279,099 A * | 1/1994 | Goodman et al. ............. 53/53 |
| 5,301,488 A * | 4/1994 | Ruhl et al. ..................... 53/55 |
| 5,444,348 A | 8/1995 | Garrec |
| 5,554,899 A | 9/1996 | Teramachi |
| 5,857,311 A * | 1/1999 | Focke et al. ................... 53/434 |

FOREIGN PATENT DOCUMENTS

| | | |
|---|---|---|
| EP | 0 090 354 A2 | 10/1983 |
| EP | 0 232 999 A2 | 8/1987 |
| GB | 2 219 267 A | 12/1989 |
| JP | 09-144831 | 6/1997 |
| JP | 10-277985 | 10/1998 |
| JP | 2000-304120 | 11/2000 |

OTHER PUBLICATIONS

Printout from merriamwebster.com; definition of "taper"; Feb. 22, 2005.*

* cited by examiner

*Primary Examiner*—Louis K. Huynh
*Assistant Examiner*—John Paradiso
(74) *Attorney, Agent, or Firm*—Staas & Halsey LLP

(57) ABSTRACT

A packing system for articles. According to one embodiment of the invention, a receiving and dropping assembly comprising one or more doors that are displaceable between a holding configuration and a dropping configuration. The doors define a receptacle while in the holding configuration. The receptacle receives and holds an article, which is received by a leading edge of the article being guided by guide surfaces in the doors. The doors drop the article being held while in the dropping configuration. An output conveyor line receives the articles dropped by the receiving and dropping assembly. A controller controls the dropping and conveyance of the articles to convey the dropped articles along the output conveyor line in predetermined arrays. A pick-and-place robot system picks up the articles or arrays of articles from the output conveyor line and places the picked up articles in receptacles.

26 Claims, 5 Drawing Sheets

PACKAGING SYSTEM

CROSS-REFERENCE TO RELATED APPLICATION

This application is based on, and claims priority to, UK Patent Application No. 0117504.1 filed on Jul. 18, 2001, the contents of which are hereby incorporated by reference.

BACKGROUND OF THE INVENTION

1. Field of the Invention

The present invention relates to a packaging system and method. In particular, the present invention relates to a packaging system and method for packaging articles in receptacles such as trays and boxes. More particularly, the present invention relates to a packaging system and method for packaging lightweight articles such as bags of potato chips and other snack foods.

2. Description of the Related Art

Conventionally, bags of potato chips and the like are produced with a high degree of automation. It is then often desired to place bags in shallow trays, suitable for display at a point of sale. Single trays may be intended to receive a controlled mixture of different products (e.g., different potato chip flavors). At present, the loading of such boxes has to be done by hand.

There are particular problems about the handling of lightweight articles. For example, a lightweight article, such as a packet of potato chips, may travel at a speed along a conveyor such that it is very difficult to apply any force to adjust the article's orientation. Even a slight force applied to an article may send the article spinning off the conveyor.

SUMMARY OF THE INVENTION

A first aspect the present invention provides a packaging system having an inlet for receiving articles (such as packets of snacks), typically delivered by a conveyor system. The articles are placed on a conveyor line in a controlled configuration and are conveyed along the conveyor line in predetermined arrays. The articles or arrays of articles are picked from the conveyor line and placed in receptacles.

Preferably, the articles are placed on the conveyor line by a receiving and dropping station that receives an article and, if necessary, adjusts its orientation prior to dropping the article onto the conveyor line. The receiving and dropping station may use, for example, a "bomb door assembly" having a hinged pair of bomb doors that are movable from a closed configuration, in which the bomb doors define a supporting floor, to an open configuration, in which the bomb doors allow an article to drop below the bomb door assembly. In the closed configuration, the bomb doors together define a receptacle having an input side through which an article is received into the receptacle. The bomb doors also form a support surface in the closed configuration that supports the received article to hold the article in the receptacle.

The bomb doors are preferably shaped so that, when in the closed configuration, the bomb doors taper from the input side of the bomb door assembly in a direction in which the article is received into the receptacle. The bomb doors also taper in a downward direction in which the article is dropped. The tapering and shaping of the bomb doors are such that an article arriving in an incorrect orientation is correctly reoriented. Thus, when the bomb doors open, the article drops properly onto the conveying line beneath the doors.

The bomb doors are preferably controlled by a common drive crank to which the bomb doors are connected by links. The links are arranged so that the bomb doors can be opened abruptly, allowing an article to fall unimpeded. The common drive crank may be controlled by, for example, a rotary actuator.

The arrival of an article at the receiving and dropping station may be detected automatically, for example, using a photocell. The photocell may send a signal to a first microprocessor that controls the operation of the receiving and dropping station and the conveying line.

The articles may be conveyed along the conveying line or output conveyor in predetermined arrays, for example, in shingled arrays. This may be achieved by controlling the operation of the bomb doors of the receiving and dropping station, generally, in conjunction with control of the output conveyor. Alternatively, the conveying line may comprise two in-line conveyors: a first (generally short) conveyor, which receives articles from the receiving and dropping station, and a second conveyor that receives articles from the first conveyor. The operations of the first and second conveyors may be controlled so that articles can be placed on the second conveyor in desired arrays, for example, in shingled groups of three, four, or five articles.

Preferably, a tray conveyor runs parallel and adjacent to the conveying line and in the opposite direction. Preferably, a tray detector (e.g., using a photocell) detects when a tray arrives in a loading region.

A pick-and-place robot assembly (robot device) transfers articles from the conveying line to a tray, and supports a pickup device that moves with three axes of motion.

The pickup device is preferably a suction device having a lower grill through which air can be sucked in to provide suction capable of lifting one or more articles. The suction is controllable, for example, by a gate assembly that is movable to obstruct the air flow. Thus, a fan that constantly runs can be provided.

The robot device may comprise, for example, a carriage capable of displacement along a rail parallel to the conveying direction. The carriage may support a forwardly-directed linear actuator to which the pickup device is connected. The forwardly-directed linear actuator is, for example, pivotally mounted about a horizontal axis extending in the conveying direction, and the forwardly-directed linear actuator is pivotable according to, for example, a vertical linear actuator device. These three displacement devices (two linear actuators and the displaceable carriage) are controlled (e.g., by the first microprocessor or by a second microprocessor) to permit coordination of their operations to achieve any desired motion of the pickup assembly. If a second microprocessor is used, it preferably communicates with the first microprocessor so that the second microprocessor "knows" when and where an array of articles is to be picked up.

In a preferred embodiment of the invention, a first detector detects an article entering the bomb door assembly. This synchronizes the operation of the bomb doors, and signals the first microprocessor, which causes the conveying line to operate to handle the article dropped by the bomb doors in the desired fashion, for example, to produce a shingled array of three articles conveyed on the second conveyor if two conveyors are used as the conveying line.

The first detector also sends a signal to the second microprocessor (or to the first microprocessor if the first microprocessor carries out both functions), which controls the robot device. The robot device also receives a signal from the first microprocessor relating to the operation of the conveying line. Thus, the second microprocessor "knows" the nature of the array being sent along the conveying line, and when the array will arrive in the region of the robot device. The second microprocessor also receives information from the tray detector. The second microprocessor knows that a tray is at the first detector at a particular time, and it knows the speed at which the tray moves. The second microprocessor likewise knows the position and speed of the array of the articles. The second microprocessor can therefore cause the robot device to operate so that the pickup device picks up the array (or a part thereof from the conveying line, which may be stopped to facilitate the picking up. The second microprocessor then assesses whether a tray is at a suitable location. If it is, then the robot device moves the pickup device so that the articles are deposited in the tray. If not, then the robot device returns to a "home" position, from which it moves once a tray is in a suitable position.

A second aspect of the invention provides a receiving and dropping station with a bomb door assembly as described above. The receiving and dropping station may also include a conveyor for conveying articles to the bomb door assembly. Preferably, the conveyor is disposed so that an article about to pass from the conveyor to the bomb door assembly is at a higher level than an article received in the bomb door assembly and ready to be dropped thereby.

In a third aspect, the invention provides an actuator assembly that may be used in the robot device. Preferably, the actuator assembly comprises an actuator for a robot arm comprising a servomotor, a threaded shaft coupled to the servomotor for rotation thereby, and a threaded element mounted, for example, on the shaft and displaceable by rotation thereof.

In a further aspect, the invention relates to methods of operating an apparatus according to the preceding aspects. The invention particularly relates to methods for handling articles in the form of, for example, pillow packs, such as potato chip packets having enclosures formed of a thin material. Such an enclosure has a seal region (and, usually, a pair of such seal regions, generally corresponding to the top and bottom of the article). A seal region is relatively stiff and flat and can thus be used for guiding a pack. Preferably, packs are conveyed to the bomb door assembly so as to present a seal region to the bomb door assembly. The bomb door assembly preferably has opposed guide regions dimensioned to guide a seal region into the bomb door assembly, correcting any minor misalignment. The guide regions (generally defined by guide creases) preferably extend horizontally at a level slightly below the adjacent conveyor level. Thus, the packs are conveyed into the bomb door assembly at a height and speed that provides a trajectory of the pack entering the bomb door assembly such that the front edge of the pack dips down and the seal portion of the pack hits the guiding crease in the bomb doors. This guides the leading edge of the pack into the door. Because the trailing edge of the pack is still clear of the bomb doors, the pack is realigned as it settles down into the profile of the bomb doors. This allows correction of the alignment of packs that may enter into the bomb doors displaced off center to the line of travel and/or twisted off square to the mechanism. The packs after alignment preferably come to rest for a few milliseconds, for example, for stabilization before being dropped. If a pack is not arrested prior to dropping, a lateral movement may occur as the pack falls, resulting in a poor presentation on the conveyor line or collation belt below the bomb door assembly.

The bomb door opening geometry allows the bomb doors to open to discharge the pack cleanly, preferably so that the pack does not touch the bomb doors as the pack drops. In other words, the pack is effectively left in free space when the bomb doors open. This provides a very repeatable drop, which, in turn, provides accurate collations that are formed for presentation to a pickup head of the pickup device.

The bomb door assembly can also be used to re-space bags fed from a source that may be intermittent or from a source that supplies a flow of packs on a variable mark space ratio. The bomb doors can be programmed to smooth out these variances so that a constant stream of packs is presented downstream of the bomb doors. This assists the pick-and-place robot assembly in working at very high efficiency without the need for high-tech camera systems. Also, picking and placing of packs are optimized, allowing for higher pickup rates, because of reduced placement distances and the pickup head readily finding the collation or pack.

A further aspect of the present invention provides a packaging method for receiving and holding each of a plurality of articles, dropping each article being held onto a conveyor, conveying the dropped articles on the conveyor in predetermined arrays, and picking up the articles or arrays of articles from the conveyor and placing the picked up articles in receptacles.

A further aspect of the present invention provides a packaging system including a receiving and dropping assembly comprising one or more doors that are displaceable between a holding configuration and a dropping configuration. The doors define a receptacle while in the holding configuration. The receptacle receives and holds an article, and the doors drop the article being held while in the dropping configuration. An output conveyor line receives the articles dropped by the receiving and dropping assembly. A controller controls the dropping and conveyance of the articles to convey the dropped articles along the output conveyor line in predetermined arrays. A pick-and-place robot system picks up the articles or arrays of articles from the output conveyor line and places the picked up articles in receptacles.

A further aspect of the present invention provides a packaging system including a receiving and dropping assembly comprising one or more doors that are displaceable between a holding configuration and a dropping configuration. The doors define a receptacle while in the holding configuration that is open at an input side and closed at an opposite side, and also define a supporting surface and a pair of opposed guide surfaces that extend away from the input side with a decrease in spacing. The receptacle successively receives and holds each of a plurality of articles. Each article has a leading edge and a trailing edge. The leading edge of each article is guided by the guide surfaces while the trailing edge of each article is still conveyed by the conveyor. Each received article is supported by the supporting surface. The doors drop each article supported by the supporting surface while in the dropping configuration. An output conveyor line receives the articles dropped by the receiving and dropping assembly. A controller controls dropping and conveyance of the articles to convey the dropped articles along the output conveyor line in predetermined arrays. A pick-and-place robot system picks up the articles or arrays of articles from the output conveyor line and places the picked up articles in receptacles.

A further aspect of the present invention provides an apparatus with a receiving and dropping assembly that has doors that are controllable to be in a closed configuration and an open configuration. When in the closed configuration, the doors together define a receptacle having an input side through which an article is received in the receptacle, and form a support surface which supports the received article to thereby hold the article in the receptacle. When an article is held in the receptacle and the doors are thereafter controlled to be in the open configuration, the held article is dropped below the assembly. The doors have a shape so that, when in the closed configuration, the doors taper from the input side in a direction in which the article is received into the receptacle and also taper in a downward direction in which the article is dropped, to thereby cause an article received into the receptacle in an incorrectly aligned position to be in a properly aligned position in the receptacle. The direction in which an article is received into the receptacle is approximately orthogonal to the downward direction in which the article is dropped. A conveyor conveys articles to the assembly so that, when the doors are in the closed configuration, the conveyor conveys a respective article into the receptacle to thereby be received into the receptacle, and when the doors are thereafter controlled to be in the open configuration and said respective article is dropped, the doors are subsequently controlled to again be in the closed position to thereby form a receptacle into which the conveyer conveys a next article.

These, together with other aspects and advantages that will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
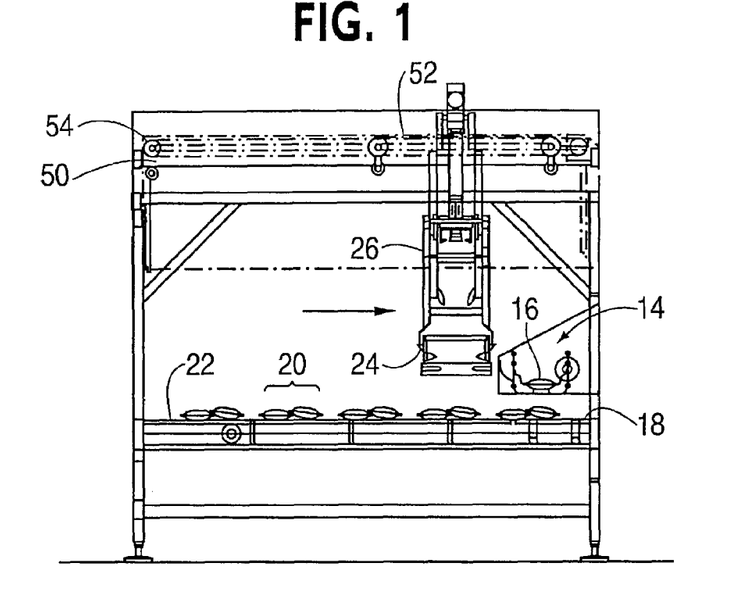
FIG. 1 is a front elevational view of a packaging apparatus according to an embodiment of the invention.
Figure 5:
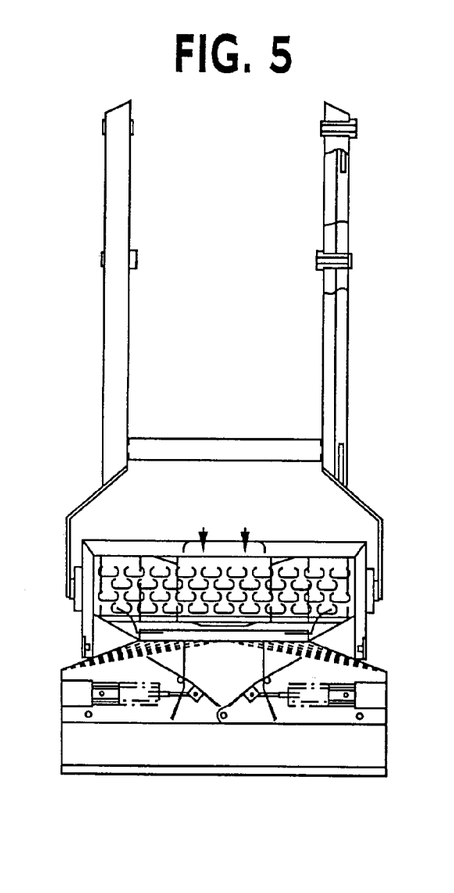
FIG. 5 is a front elevational view of a pickup assembly according to an embodiment of the invention.
Figure 6:
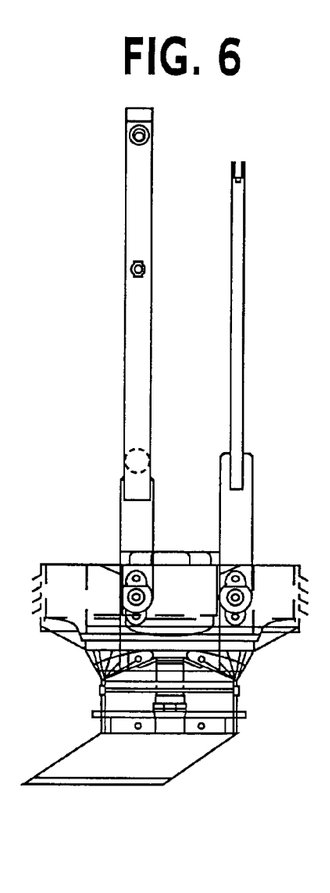
FIG. 6 is a side elevational view of the pickup assembly shown in FIG. 5.
Figure 9:
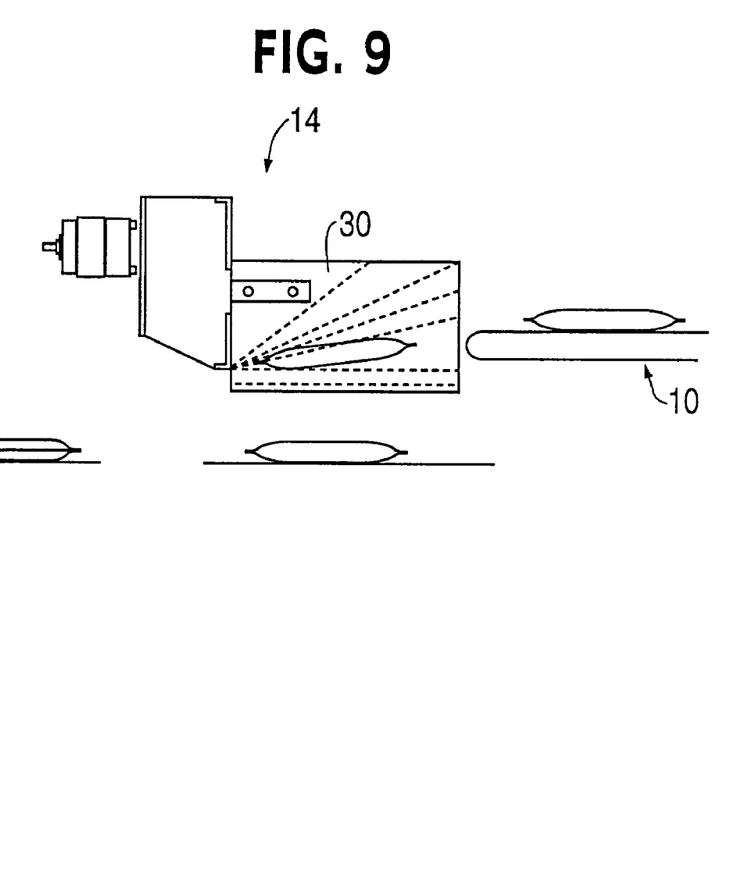
FIG. 9 is a side elevational view of the bomb door assembly of FIG. 4.

The invention is described by way of an example. The accompanying drawings show an apparatus used for packaging articles, such as packets of snack foods (e.g., potato chips). The articles 16 are delivered to a packaging apparatus via an infeed conveyor 10 (see FIGS. 2 and 9). A sensor of a photocell device 12 detects the arrival of an article 16. An individual article 16 is delivered to a bomb door assembly 14. From the bomb door assembly 14, an article 16 is dropped a short distance onto a first conveyor belt 18, which is generally short in length. These devices run intermittently, under the control of a microprocessor, which receives signals from the photocell device 12 and also controls the operation of the bomb door assembly 14. The intermittent operation of the first conveyor 18 is controlled so that successive articles 16 are assembled into desired arrays. In FIG. 1, these arrays are shown, for example, as shingled pairs 20. The arrays are conveyed on a main conveyor belt 22. The main conveyor belt 22 also has controlled intermittent operation so that an array of articles is conveyed to a pickup location where the array is picked up while the main conveyor belt 22 is stationary. The picking up is effected by, for example, a pickup device 24 mounted on a robotic carrier 26, which carries the array of articles to a tray 28 (see FIG. 3) that is conveyed on a parallel tray conveyor. FIGS. 5 and 6 show front and side elevational views of a pickup assembly according to an embodiment of the present invention.

Figure 4:
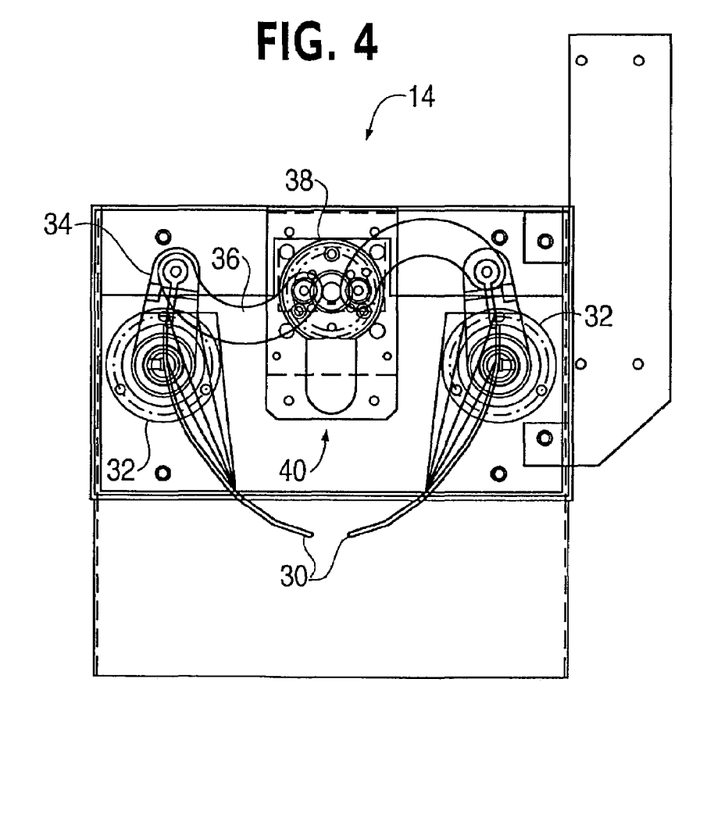
FIG. 4 is a front elevational view, on a larger scale, of a bomb door assembly according to an embodiment of the invention.
Figure 7:
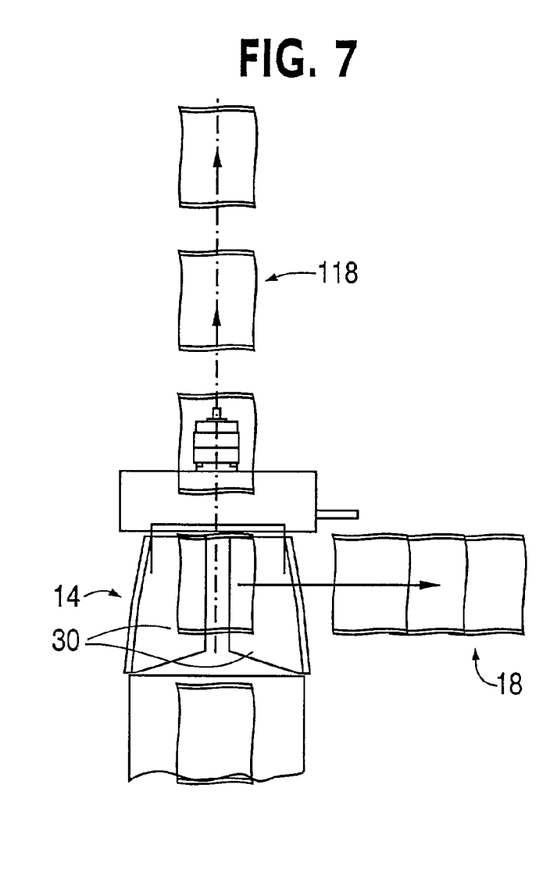
FIG. 7 is a top plan view of the bomb door assembly of FIG. 4, including a first conveyor and a second conveyor.

The bomb door assembly 14 is shown in more detail in FIGS. 4 and 7. A pair of mirror-image doors 30, for example, are pivotally mounted via bushings 32 so that the doors 30 are pivotable from a closed configuration, in which the doors 30 define a generally U-shaped floor, to an open configuration. For this purpose, each bushing 32 is, for example, fast with a short arm 34 that is pivoted to a respective C-shaped link 36, which is pivoted, in turn, to a rotatable disc 38 fast with a rotary actuator 40. The arrangement is such that rotation of the rotary actuator 40 causes rapid opening of the doors 30, where the motion of the doors 30 approximates simple harmonic motion. In the illustrated apparatus of FIG. 4, the doors 30 are coupled together for motion. Alternatively, the doors 30 can be independently movable.

The doors 30 are shaped so that, in the closed configuration shown in FIG. 4, the doors 30 define a space that tapers in a downward direction, in the direction in which the article is dropped. The downward tapering, visible in FIG. 4, is achieved, for example, via a series of door portions that are connected to one another at angled joints. The lower region of the doors 30 may define a horizontal floor in the closed configuration. The tapering of the doors 30 is designed so that an article 16 coming into the doors 30 from the infeed conveyor 10 will come to rest in the correct position and orientation. Then, when the doors 30 open, the article 16 falls properly onto the first conveyor 18 beneath the doors 30.

Figure 8:
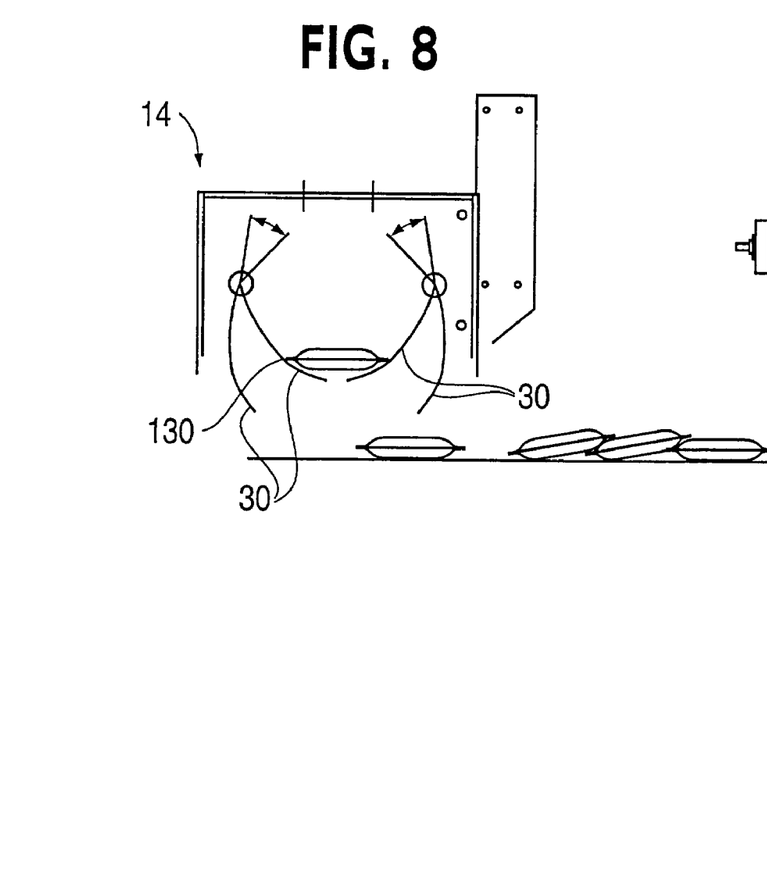
FIG. 8 is another front elevational view of the bomb door assembly of FIG. 4.

The doors 30 are shaped and mounted so that in the closed position, the doors 30 have a pair of spaced crease regions 130 (see FIG. 8) that extend horizontally, suitably spaced to guide an article 16, primarily by engaging a leading seal region thereof. The mouths of the crease regions 130 (adjacent the infeed conveyor 10) splay out, but the bulk of the creases is straight. The creases 130 are at a level slightly below the level of the infeed conveyor 10.

Figure 2:
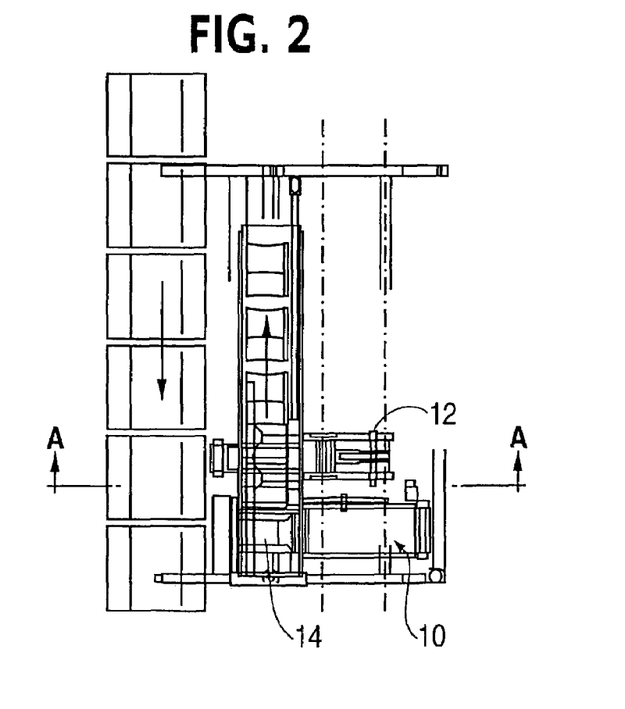
FIG. 2 is a top plan view of the apparatus shown in FIG. 1.
Figure 3:
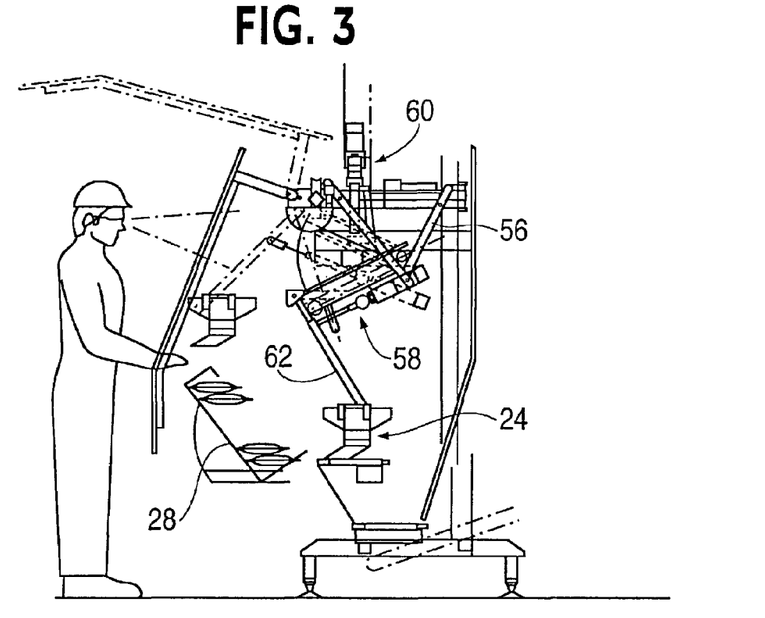
FIG. 3 is a sectional view taken in the direction of the arrows, along the section A—A of FIG. 2.

FIG. 7 shows that the outfeed conveyor onto which articles 16 are dropped by the bomb door assembly 14 may be a lateral conveyor, such as the first conveyor 18 as shown in FIGS. 1–3, or the outfeed conveyor may have another orientation, such as an in-line conveyor 118.

Referring to FIGS. 1 and 3, a parallel rail 50, on which a carriage 52 travels, is driven by a belt and pulley system 54. The carriage 52 forms part of the robot device. The carriage 52 carries a pivotable arm 56 that is pivotally connected to the rear end of a forwardly-directed piston and cylinder assembly or actuator 58. An intermediate region of this assembly 58 is coupled to a vertically acting piston and cylinder assembly or actuator 60. Thus, the vertically acting piston and cylinder assembly 60 causes the forwardly-directed piston and cylinder assembly 58 to pivot in the plane of FIG. 3. The forwardly-directed piston and cylinder assembly 58 carries an arm 62 on which the pickup device 24 is mounted. Operation of the two piston and cylinder assemblies 58, 60 and movement of the carriage 52 (which, together, provide three axes of movement) are controlled by a first microprocessor. Thus, the pickup head can move to any position within its range. In particular, the pickup head can be lowered towards the main conveyor belt 22 to pick articles 16 at any position within a predetermined range. The pickup head can then move forwardly to place the articles 16 in a tray 28 carried on the tray conveyor. A second microprocessor uses data on the speed and position of the tray 28 and the speed, position, and nature (such as an n-article shingled array) of an article 16 or array of articles to compute optimum paths for the pickup device to follow in picking up articles 16 and placing the articles 16 at correct locations in a tray 28 and/or moving to a home position where the pickup device 24 remains until it is determined that it is time to move to a calculated tray position or to a calculated array picking-up position.

Figure 10:
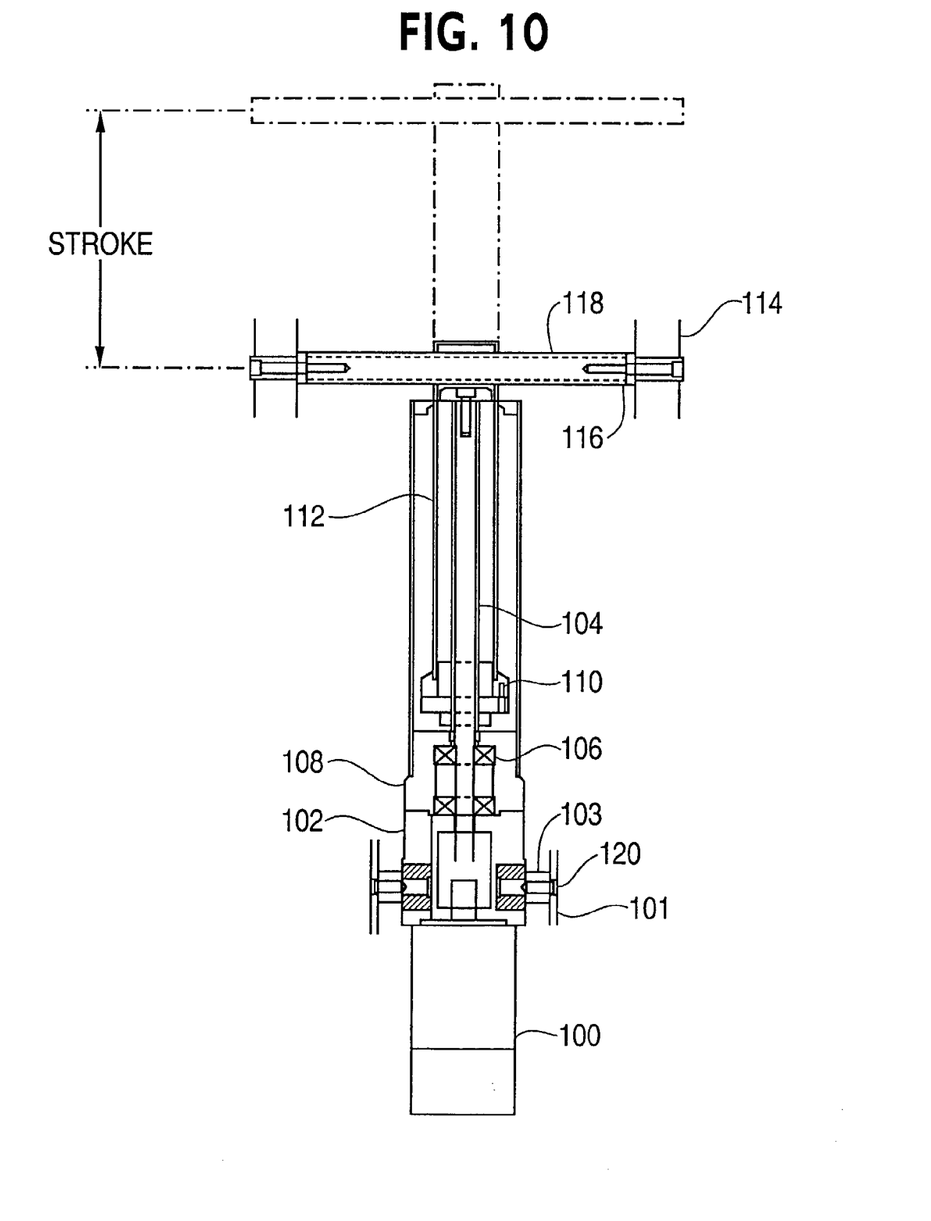
FIG. 10 is a sectional view of an actuator assembly according to an embodiment of the invention.

FIG. 10 shows a preferred actuator assembly for the robot device. The actuator assembly uses a servomotor 100, which is secured in a motor housing 102. The motor housing 102 is mounted to a fixed frame 101 pivotally via a motor pivot 103 in the embodiment shown in FIG. 10. The servomotor 100 rotates an actuator screw 104. The coupling is indirect, via a flexible coupling 120 using a pair of angular contact bearings 106 housed in a bearing housing 108 fixed to the motor housing 102.

The actuator screw 104 bears an actuator screw nut 110, which is axially displaceable by rotation of the actuator screw 104. The actuator screw 104 is attached to a thrust tube 112, which is pivotally connected to a movable frame 114 via pivot bushes 116 and a pivot shaft 118. In operation, rotation of the motor 100 in either sense causes the actuator nut 110 to move axially along the actuator screw 104 in a corresponding direction. The thrust tube 112 moves with the actuator nut 110, thus increasing the distance between the motor pivot 103 and the pivot shaft 118 associated with the remote end of the thrust tube 112.

The actuator assembly shown in FIG. 10 can give a robust and efficient system, very suitable for use in a robotic system as described herein. Preferably, the actuator assemblies are positioned outside the support and swinging members. This facilitates maintenance and makes the system very efficient, allowing lightweight, low power drives to be used without the need for costly gearboxes.

The resulting robot arm employing such an actuator assembly can be very fast, compared with existing robotic systems (e.g., cast type paint robots and x-y robots). This is due to the efficiency that results because the actuator assembly and framework move much less than the pickup head. The system formed by the actuator assembly and framework operates similar to a human leg with the muscles working beside the bone-supporting framework.

The present invention is applicable to packaging systems adapted to be operated in a continuous mode of article transportation, as well as in the intermittent mode of article transportation.

The conveyors are not limited to any particular size, shape, or type of conveyor. The articles are not limited to any particular size, shape, weight, or type of articles. The robot device and actuator assemblies are not limited to any particular configurations. The bomb door assembly is not limited to any particular number or size of bomb doors, angles providing downward tapering of the bomb doors, bushings, etc. The arrays of articles are not limited to any particular configuration. Instead, various modifications can be made to these features to achieve the intended operation of the present invention.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A packaging system, comprising:
a receiving and dropping assembly comprising one or more doors that are displaceable between a holding configuration and a dropping configuration, the doors defining a receptacle in the holding configuration, the receptacle successively receiving, aligning, and holding each of a plurality of articles, and the doors dropping each of the aligned articles being held in the dropping configuration;
an output conveyor line receiving the articles dropped by the receiving and dropping assembly;
means for controlling the operation of said one or more doors in conjunction with controlled intermittent running of the output conveyor line to cause the dropped articles to be conveyed along the output conveyor line in predetermined arrays and so that, for each array, the articles in the array contact a conveying surface of the output line conveyor and are adjacently positioned with respect to each other along the conveying surface with adjacent articles in the array contacting each other, and so that arrays are spaced apart from each other; and
means for picking up the articles or arrays of articles from the output conveyor line and placing the picked up articles in receptacles.

2. The packaging system of claim 1, wherein the output conveyor line comprises:
a first conveyor receiving the articles from the receiving and dropping assembly,
a second conveyor receiving articles from the first conveyor, the two conveyors being independently controllable with articles being placed on the second conveyor in predetermined arrays, and
said means for controlling controls the intermittent running of the first conveyor to cause the dropped articles to be conveyed along the output conveyor line in the predetermined arrays.

3. The packaging system of claim 1, wherein the means for controlling controls displacement of the doors.

4. The packaging system of claim 1, further comprising a tray conveyor in parallel with, and adjacent to, the output conveyor line.

5. The packaging system of claim 1, wherein the means for picking up the articles or arrays of articles comprises a pick-and-place robot system having a plurality of axes of independent displacement.

6. A packaging system as in claim 1, wherein the arrays are shingled pairs.

7. A packaging system, comprising:
- a receiving and dropping assembly comprising one or more doors that are displaceable between a holding configuration and a dropping configuration, the doors defining a receptacle while in the holding configuration, the receptacle successively receiving, aligning, and holding each of a plurality of articles, and the doors dropping each of the aligned articles being held while in the dropping configuration;
- an output conveyor line receiving the articles dropped by the receiving and dropping assembly;
- a controller controlling dropping and conveyance of the articles to convey the dropped articles along the output conveyor line in predetermined arrays so that, for each array, the articles in the array contact a conveying surface of the output line conveyor and are adjacently positioned with respect to each other along the conveying surface with adjacent articles in the array contacting each other, and so that arrays are spaced apart from each other; and
- a pick-and-place robot system picking up the articles or arrays of articles from the output conveyor line and placing the picked up articles in receptacles.

8. A packaging system as in claim 7, wherein the arrays are shingled pairs.

9. A packaging system for a plurality of articles, each article having a leading edge and a trailing edge, the packaging system comprising:
- a receiving and dropping assembly comprising one or more doors that are displaceable between a holding configuration and a dropping configuration, said one or more doors tapering in a downward direction and defining a receptacle with a supporting surface and a pair of opposed guide surfaces in the holding configuration, the receptacle successively receiving each of the articles, each article being guided by the guide surfaces and supported by the supporting surface, and said one or more doors dropping each of the guided articles supported by the supporting surface in the dropping configuration;
- an output conveyor receiving the articles dropped by the receiving and dropping assembly;
- a controller controlling dropping and conveyance of the articles to convey the dropped articles along the output conveyor in predetermined arrays so that, for each array, the articles in the array contact a conveying surface of the output line conveyor and are adjacently positioned with respect to each other along the conveying surface with adjacent articles in the array contacting each other, and so that arrays are spaced apart from each other; and
- a pick-and-place robot system picking up the articles or arrays of articles from the output conveyor and placing the picked up articles in receptacles.

10. A packaging system as in claim 9, wherein the arrays are shingled pairs.

11. An apparatus comprising:
- a receiving and dropping assembly comprising doors that are displaceable between a holding configuration and a dropping configuration, the doors defining a receptacle while in the holding configuration, the receptacle successively receiving, aligning, and holding each of a plurality of articles, and the doors dropping each of the aligned articles being held while in the dropping configuration;
- an output conveyor line receiving the articles dropped by the receiving and dropping assembly; and
- a controller controlling dropping of the articles by the receiving and dropping assembly in conjunction with controlling conveyance of the articles by the output conveyor line to drop and convey the dropped articles along the output conveyor line in predetermined arrays so that, for each array, the articles in the array contact a conveying surface of the output line conveyor and are adjacently positioned with respect to each other along the conveying surface with adjacent articles in the array contacting each other, and so that arrays are spaced apart from each other.

12. An apparatus as in claim 11, wherein the arrays are shingled pairs.

13. An apparatus for use with a plurality of articles, each article having a leading edge and a trailing edge, the apparatus comprising:
- a receiving and dropping assembly comprising one or more doors that are displaceable between a holding configuration and a dropping configuration, said one or more doors tapering in a downward direction and defining a receptacle with a supporting surface and a pair of opposed guide surfaces in the holding configuration, the receptacle successively receiving each of the articles, each article being guided by the guide surfaces and supported by the supporting surface, and said one or more doors dropping each of the guided articles supported by the supporting surface in the dropping configuration;
- an output conveyor receiving the articles dropped by the receiving and dropping assembly; and
- a controller controlling dropping of the articles by the receiving and dropping assembly in conjunction with controlling conveyance of the articles by the output conveyor to drop and convey the dropped articles along the output conveyor in predetermined arrays so that, for each array, the articles in the array contact a conveying surface of the output conveyor and are adjacently positioned with respect to each other along the conveying surface with adjacent articles in the array contacting each other, and so that arrays are spaced apart from each other.

14. An apparatus as in claim 13, wherein the arrays are shingled pairs.

15. An apparatus comprising:
- a receiving and dropping assembly comprising movable doors which are controllable to be in a closed configuration and an open configuration, wherein,
  - when in the closed configuration, the doors together define a receptacle having an input side through which an article is received in the receptacle, and form a support surface which supports the received article to thereby hold the article in the receptacle,
  - when an article is held in the receptacle and the doors are thereafter controlled to be in the open configuration, the held article is dropped below the receiving and dropping assembly,
  - the doors having a shape so that, when in the closed configuration, the doors taper from the input side in a direction in which the article is received into the receptacle and also taper in a downward direction in which the article is dropped, to thereby cause an article received into the receptacle in an incorrectly aligned position to be in a properly aligned position in the receptacle, and
  - the receiving and dropping assembly receives and drops a plurality of articles in succession;

an output conveyor receiving the articles dropped by the receiving and dropping assembly; and a controller controlling the doors of the receiving and dropping assembly to be in the closed configuration and open configuration in conjunction with controlling intermittent running of the output conveyor to convey the dropped articles along the output conveyor in predetermined arrays so that, for each array, the articles in each array contact a conveying surface of the output conveyor and are adjacently positioned with respect to each other along the conveying surface with adjacent articles in the array contacting each other, and so that arrays are spaced apart from each other.

16. An apparatus as in claim 15, wherein the arrays are shingled pairs.

17. An apparatus comprising:

a receiving and dropping assembly comprising movable doors which are controllable to be in a closed configuration and an open configuration, wherein, when in the closed configuration, the doors together define a receptacle having an input side through which an article is received in the receptacle, and form a support surface which supports the received article to thereby hold the article in the receptacle, when an article is held in the receptacle and the doors are thereafter controlled to be in the open configuration, the held article is dropped below the receiving and dropping assembly, the doors having a shape so that, when in the closed configuration, the doors taper from the input side in a direction in which the article is received into the receptacle and also taper in a downward direction in which the article is dropped, to thereby cause an article received into the receptacle in an incorrectly aligned position to be in a properly aligned position in the receptacle, and the receiving and dropping assembly receives and drops a plurality of articles in succession;

an output conveyor receiving the articles dropped by the receiving and dropping assembly; and means for controlling the doors of the receiving and dropping assembly to be in the closed configuration and open configuration in conjunction with controlling intermittent running of the output conveyor to convey the dropped articles along the output conveyor in predetermined arrays so that, for each array, the articles in the array contact a conveying surface of the output conveyor and are adjacently positioned with respect to each other along the conveying surface with adjacent articles in the array contacting each other, and so that arrays are spaced apart from each other.

18. An apparatus as in claim 17, wherein the arrays are shingled pairs.

19. An apparatus comprising:

a receiving and dropping assembly controllable to be in a closed configuration and an open configuration, wherein, when in the closed configuration, the receiving and dropping assembly defines a receptacle having an input side through which an article is received in, and then held in, the receptacle, when an article is held in the receptacle and the receiving and dropping assembly is controlled to be in the open configuration, the held article is dropped below the receiving and dropping assembly, and the receiving and dropping assembly receives and drops a plurality of articles in succession;

an output conveyor receiving the articles dropped by the receiving and dropping assembly; and a controller controlling the receiving and dropping assembly to be in the closed configuration and open configuration in conjunction with controlling intermittent running of the output conveyor to convey the dropped articles along the output conveyor in predetermined arrays so that, for each array, the articles in the array contact a conveying surface of the output conveyor and are adjacently positioned with respect to each other along the conveying surface with adjacent articles in the array contacting each other, and so that the arrays are spaced apart from each other.

20. An apparatus as in claim 19, wherein the arrays are shingled pairs.

21. An apparatus comprising:

a receiving and dropping assembly controllable to be in a closed configuration and an open configuration, wherein, when in the closed configuration, the receiving and dropping assembly defines a receptacle having an input side through which an article is received in, and then held in the receptacle, when an article is held in the receptacle and the receiving and dropping assembly is controlled to be in the open configuration, the held article is dropped below the receiving and dropping assembly, and the receiving and dropping assembly receives and drops a plurality of articles in succession;

an output conveyor receiving the articles dropped by the receiving and dropping assembly; and means for controlling the receiving and dropping assembly to be in the closed configuration and open configuration in conjunction with controlling intermittent running of the output conveyor to convey the dropped articles along the output conveyor in predetermined arrays so that, for each array, the articles in the array contact a conveying surface of the output conveyor and are adjacently positioned with respect to each other along the conveying surface with adjacent articles in the array contacting each other, and so that arrays are spaced apart from each other.

22. An apparatus as in claim 21, wherein the arrays are shingled pairs.

23. An apparatus comprising:

a receiving and dropping assembly comprising movable doors which are controllable to be in a closed configuration and an open configuration, wherein, when in the closed configuration, the doors together define a receptacle having an input side through which an article is received in the receptacle, and form a support surface which supports the received article to thereby hold the article in the receptacle, when an article is held in the receptacle and the doors are thereafter controlled to be in the open configuration, the held article is dropped below the assembly, and the doors having a shape so that, when in the closed configuration, the doors taper from the input side in a direction in which the article is received into the receptacle and also taper in a downward direction in which the article is dropped, to thereby cause an article received into the receptacle in an incorrectly aligned position to be in a properly aligned position in the receptacle.

24. An apparatus as in claim 23, wherein the direction in which an article is received into the receptacle is approximately orthogonal to the downward direction in which the article is dropped.

25. An apparatus as in claim 23, further comprising:
a conveyor conveying articles to the assembly so that, when the doors are in the closed configuration, the conveyor conveys a respective article into the receptacle to thereby be received into the receptacle, and when the doors are thereafter controlled to be in the open configuration and said respective article is dropped, the doors are subsequently controlled to again be in the closed position to thereby form a receptacle into which the conveyer conveys a next article.

26. An apparatus as in claim 25, wherein the direction in which an article is received into the receptacle is approximately orthogonal to the downward direction in which the article is dropped.

* * * * *

UNITED STATES PATENT AND TRADEMARK OFFICE
CERTIFICATE OF CORRECTION

PATENT NO. : 6,988,350 B2
DATED : January 24, 2006
INVENTOR(S) : Robert Bennett

It is certified that error appears in the above-identified patent and that said Letters Patent is hereby corrected as shown below:

Title page,
Item [57], ABSTRACT,
Line 1, delete "packing" and insert -- packaging --.

Column 12,
Line 23, after "in" insert -- , --.

Signed and Sealed this

Sixteenth Day of May, 2006

JON W. DUDAS
*Director of the United States Patent and Trademark Office*